United States Patent Office 2,870,127
Patented Jan. 20, 1959

2,870,127

PROCESS FOR PRODUCING SYNTHETIC LINEAR AROMATIC SULFUR-CONTAINING CONDENSATION POLYESTERS AND PRODUCTS THEREOF

George E. Ham, Decatur, Ala., assignor to The Chemstrand Corporation, Decatur, Ala., a corporation of Delaware No Drawing. Application December 13, 1954
Serial No. 474,985

16 Claims. (Cl. 260—78.4)

This invention relates to the production of synthetic linear condensation polyesters. More particularly, the invention is concerned wtih a new and improved process for preparing highly polymeric polyesters, such as polyalkylene esters of aromatic dicarboxylic acids, which are fiber- and filament-forming and the filaments produced therefrom, possess the property of cold drawing.

This application is a continuation-in-part of my copending application Serial No. 347,161, filed April 6, 1953.

The simplest form of polymer containing ester linkages is the polyester and it is well-known that linear polyesters can be made from dibasic acids and glycols. When these polyesters are in a highly polymerized condition, they can be formed into filaments, fibers, and the like, which can be permanently oriented by cold drawing. That is, when the esterification reaction is carried out for a sufficiently prolonged period under conditions such as to remove the water of reaction effectively, linear polyesters may be produced having extremely high molecular weights, which, in the case of polyesters capable of crystallizing at ordinary temperatures, may possess the property of cold drawing. The non-crystalline polyesters of high molecular weight are viscous liquids at ordinary temperatures whereas the crystallizable polyesters are hard, tough, microcrystalline substances which melt at a definite crystalline melting point to form viscous liquids.

When preparing a polyester from a dibasic acid and a glycol the reaction takes place in two stages. In the first stage an intermediate product is formed which is an hydroxyalkyl derivative of the dibasic acid and water is evolved. In the second stage a simple molecule, such as water or glycol, is evolved forming the polyester. High temperatures are necessary to effect the first stage of the reaction and the reaction mass must be maintained at these elevated temperatures for considerable lengths of time. These factors have led to discoloration of the polyester, which obviously is undesirable when producing filaments and fibers for commercial use. In addition, the prolonged periods of time necessary to effect reaction are not conducive to continuous production, which is desirable when operating on a commercial scale.

Accordingly, it is an object of the present invention to provide a new and improved process for producing synthetic linear condensation polyesters which are capable of being formed into filaments, fibers, and the like, and which, when cold drawn, show permanent orientation along the fiber axis, as revealed by characteristic X-ray patterns. It is another object of the invention to provide a new and improved process for producing synthetic linear condensation polyesters which results in a reduction of time in which reaction takes place. It is still another object of the invention to provide a new and improved process for producing synthetic linear condensation polyesters which is more economical than prior processes and which is conducive to continuous operation.

It is a still further object of the invention to provide new and improved synthetic linear condensation polyesters. Other objects and advantages of the present invention will be apparent from the description thereof hereinafter.

It has unexpectedly been found that the disadvantages of prior art methods can be overcome and the objects of the present invention can, in general be accomplished, by replacing the glycol with an alkylene sulfite. For example, ethylene sulfite or propylene sulfite may be successfully employed in the practice of the present invention.

In the preparation of synthetic linear condensation polyesters from a dibasic acid and a glycol, the dibasic acid and glycol are mixed together and heated in the presence or absence of esterification catalysts, as desired. It is necessary to employ at least about one molecular proportion of the glycol per molecular proportion of dibasic acid. Generally, however, higher proportions of the glycol relative to the dibasic acid are used. For example, up to five moles of glycol per mole of dibasic acid are employed because by so doing the initial esterification is said to take place more readily. However, even at this upper ratio of 5 moles glycol per mole of dibasic acid the time is prohibitive for continuous operation since a minimum of 7 to 8 hours is necessary to complete the first or initial esterification reaction whereby the glycol ester of the dibasic acid is formed. However, when employing an alkylene sulfite in place of the glycol the time for effecting the initial esterification is considerably reduced. It has been found that in the process of the present invention, the dibasic acid and alkylene sulfite may be employed in the following ratio: one mole of dibasic acid to 1 to 9 moles of alkylene sulfite.

During the first stage of the reaction (initial esterification to form the glycol ester) the temperature approaches the boiling point of glycol. When all of the acid has reacted with the sulfite, the temperature is increased. The residue is then further heated above its melting point. This is known as the second stage and the one in which condensation takes place forming the linear condensation polyester. It is to be noted, however, that the polyester may be formed in one stage. That is, when a clear solution is first formed it contains the polymer and further heating may be minimized or eliminated. This accounts for the great saving in time of reaction, noted in more detail hereinafter.

During the second stage, glycol is liberated and the melting point and the viscosity of the reaction mixture gradually increases. The heating is continued until the melt produced has cold-drawing properties, i. e., filaments formed from the melt are capable of being cold drawn. The heating may be carried out at atmospheric or sub-atmospheric pressures, and preferably in an inert atmosphere in the absence of an oxygen-containing gas. This may be accomplished by bubbling an inert gas, such as nitrogen, through the molten mass. Any inert gas may be employed.

The glycol liberated in the second stage must be removed which in turn means maintaining the reaction mixture or molten mass at elevated temperatures for prolonged periods of time. This prolonged heating tends to discolor the resultant polyester which is obviously undesirable from a commercial standpoint. However, when employing an alkylene sulfite in place of the glycol, proportionately smaller quantities may be employed than glycol and still achieve the same beneficial properties in the resultant polyester which means a smaller amount of glycol formed. This in turn necessitates the removal of less glycol which shortens the period of heating thus alleviating the danger of discoloration of the product.

During the first stage of the reaction, wherein the hydroxyalkyl ester of the dibasic acid is formed, no inert solvent medium is employed. Therefore, mixing of solid dibasic acid with glycol has presented a problem heretofore. When employing an alkylene sulfite, sulfur dioxide is evolved which, when bubbling through the reaction mass, stirs the same. This is an additional physical advantage of the instant process.

In the practice of the present invention aromatic dibasic acids are employed, such as o-phthalic acid, isophthalic acid, terephthalic acid, homophthalic acid, 4,4'-diphenyldicarboxylic acid, p,p' - dicarboxydiphenylsulfone, naphthalene-1,5-dicarboxylic acid, p-carboxyphenoxyacetic acid, etc.

In the first stage of the reaction, in accordance with the present process, temperatures within the range of 90 to 160° C. may be employed. In the second stage, the mass is heated above the melting point thereof, which will vary with the nature of the polymer or intermediate product obtained. The temperature is maintained throughout the second stage at a point sufficiently high to maintain a molten mass in the reaction vessel.

If desired, as pointed out hereinbefore, esterification catalysts may be employed in the first stage, such as p-toluenesulfonic acid, camphor-sulfonic acid, and the like.

The polyesters of the instant invention have a different structure than those formed heretofore from aromatic dibasic acids and glycols, such as ethylene glycol, as borne out by the lower melting points thereof. Sulfur analysis of the polymers produced has shown that the same are modified with recurring structural units in amounts ranging from 0.5% to 20% of the formula

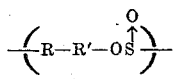

wherein R is the dibasic acid residue, such as

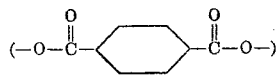

and the like, and R' is ethylene or propylene.

Further details of the present invention are set forth in the following specific examples, which are merely intended to be illustrative and not limitative. Unless otherwise indicated, all parts and percents are by weight.

Example I

A mixture of 3.0 grams of terephthalic acid, which had been recrystallized from N,N-dimethylacetamide, and 3.9 grams of ethylene sulfite was heated to a temperature of 150° C. in a glass reaction vessel set in a liquid heating bath. After heating at 150° C. for 30 minutes, a clear solution was obtained. Sulfur dioxide was evolved during this step. Thereafter the temperature was raised to 255° C. with slow introduction of nitrogen to the reaction vessel at one mm. pressure. A melt having a viscosity of approximately 1000 poises at 255° C. was obtained. Upon cooling the melt, an amorphous polymer, which was essentially polyethylene terephthalate, was obtained. The polymer also contained 1.28 percent sulfur. Upon the belief that undecomposed sulfite groups were present in the polymer, a sample was analyzed and the polymer was found to contain 10% recurring units or one unit in ten, of the structure:

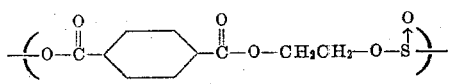

The polymer possessed a sticking point of 120° C. and yielded fibers on drawing.

It has been found that the reactivity of alkylene sulfite is increased in the presence of an alkaline substance. Accordingly, the increased activity observed in Example I was probably due to the presence of an amine derived from the N,N-dimethylacetamide, which in turn was employed as the recrystallization solvent in purifying the terephthalic acid employed.

Example II

A mixture of 2 grams of terephthalic acid, which had been recrystallized from N-methylpyrrolidone, and 5 grams of ethylene sulfite was heated in a glass reaction vessel set in a bath of methyl salicylate at 222° C. The ethylene sulfite was replenished as a portion distilled out to keep a constant volume over an eight hour period. At the end of this time 0.05 gram of undissolved terephthalic acid was removed by hot decantation. To the reacted portion, 0.005 gram of zinc acetate catalyst was added and the temperature was raised to 280° C. with nitrogen introduction. Rapid polymerization occurred. After a period of ¾ hour a melt of 1200 poises resulted. The polymer possessed a softening point of 70–75° C. and crystallized at 100° C. on a Johns melting-point block. It subsequently melted sharply at 189°–190° C. A slight tendency to crystallize was noted on slow cooling to room temperature. Sulfur analysis indicated very few recurring structural units as defined in Example I. Fibers were drawn from the polymer melt which were soft, lustrous, and slightly brittle. The fibers possessed about 50% elongation.

Example III

A mixture of 5 grams of p,p'-dicarboxybiphenyl and 6 grams of ethylene sulfite was heated at 222° C. for 4 hours, as outlined in Example I, and then ethylene glycol was removed by distillation. A dark brown, crystalline polyester which softened at 85° C. and melted at 110° C. was obtained.

Example IV

Using the procedure of Example III, terephthalic acid was condensed with propylene sulfite. Polypropylene terephthalate, modified with ethylene sulfite, was obtained which had a melting point below 100° C.

The synthetic linear condensation polyesters, produced in accordance with the instant process, while having their greatest utility in the filament-and fiber-forming art, are also particularly adapted to molding applications. The filaments may be formed by extrusion or by drawing directly from the polymer melt after the completion of the heating (second stage) or after remelting, if desired. Any suitable apparatus may be employed in forming the fibers and filaments. The polyesters of the instant invention are more plastic and accordingly filaments can be drawn therefrom at lower temperatures.

Filaments, produced from the polyesters prepared in accordance with the present invention, can be cold-drawn to as much as several times their original lengths. They have greater elongation and are more elastic. These cold-drawing operations may be carried out on filaments, which have been allowed to cool fully and solidify, or the cold-drawing may follow the formation of the filaments directly as one part of a continuous process. In this regard, it should also be pointed out that the instant process lends itself to continuous operation due to the great decrease in time to effect condensation or production of the polyesters over processes employed heretofore.

In the cold-drawing operation any suitable apparatus and process may be used. For example, the filaments may be wound from one roller to another with the second roller rotating at a higher speed than the first roller. For example, the second roller may be rotated at a speed up to about four or five times that of the first roller. If desired, cold-drawing may be effected by employing a snubbing pin.

The term cold-drawing, as used herein, includes, in addition to drawing filaments at temperatures as low as 0° C., warming the filaments to facilitate stretching, for example, by passing the filaments through warm or hot water or steam before and/or during the cold-drawing operation, or drawing the filaments at any temperature below the melting point thereof.

Further, highly polymeric linear esters obtained according to the process of the present invention may be formed into other useful shaped articles. For example, the melt of the highly polymeric linear polyester may be formed into films and moldings by conventional procedures and apparatus. In addition, the polyesters may be used for hot melt coatings or as adhesives, plasticizers, binders for coating compositions or bonding materials for laminated fabrics.

It is to be understood that changes and variations may be made without departing from the spirit and scope of the invention as defined in the appended claims.

I claim:

1. In the manufacture of synthetic linear condensation sulfur-containing polyesters the steps comprising, forming a mixture of an aromatic dicarboxylic acid and a compound selected from the group consisting of ethylene sulfite and propylene sulfite, said components being present in the mixture in a molar ratio of one mole of acid to 1 to 9 moles of the compound, heating and reacting said mixture at a temperature in the range of 90° to 160° C. until no more sulfur dioxide is evolved, and thereafter continuing the heating at a temperature sufficient to maintain the reaction mass in a molten state until a sulfur-containing polyester is produced.

2. The process defined in claim 1 wherein the compound is ethylene sulfite.

3. The process defined in claim 1 wherein the compound is propylene sulfite.

4. The process defined in claim 1 wherein the dicarboxylic acid is terephthalic acid.

5. The process defined in claim 1 wherein the dicarboxylic acid is isophthalic acid.

6. The process defined in claim 1 wherein the dicarboxylic acid is 4,4'-diphenyldicarboxylic acid.

7. The process defined in claim 1 wherein the dicarboxylic acid is terephthalic acid and the compound is ethylene sulfite.

8. The process defined in claim 7 wherein the molar ratio of terephthalic acid to ethylene sulfite is one mole terephthalic acid to about 2 to 4 moles of ethylene sulfite.

9. Synthetic linear condensation sulfur-containing polyesters produced in accordance with the process of claim 1 and containing from 0.5 to 20% of recurring structural units of the formula:

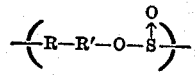

wherein R is the aromatic dicarboxylic acid residue of the acid employed in the reaction and R' is selected from the group consisting of ethylene and propylene.

10. The sulfur-containing polyesters produced in accordance with the process of claim 2.

11. The sulfur-containing polyesters produced in accordance with the process of claim 3.

12. The sulfur-containing polyesters produced in accordance with the process of claim 4.

13. The sulfur-containing polyesters produced in accordance with the process of claim 5.

14. The sulfur-containing polyesters produced in accordance with the process of claim 6.

15. The sulfur-containing polyesters produced in accordance with the process of claim 7.

16. The sulfur-containing polyesters formed in accordance with the process of claim 8 and containing from 0.5% to 20% recurring structural units of the formula:

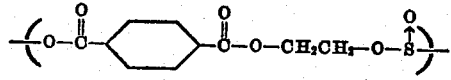

References Cited in the file of this patent

UNITED STATES PATENTS

| | | |
|---|---|---|
| 2,448,767 | Carlson | Sept. 7, 1948 |
| 2,465,319 | Whinfield et al. | Mar. 22, 1949 |